April 21, 1953 — F. R. McFARLAND — 2,635,713
BRAKE
Filed Oct. 8, 1947
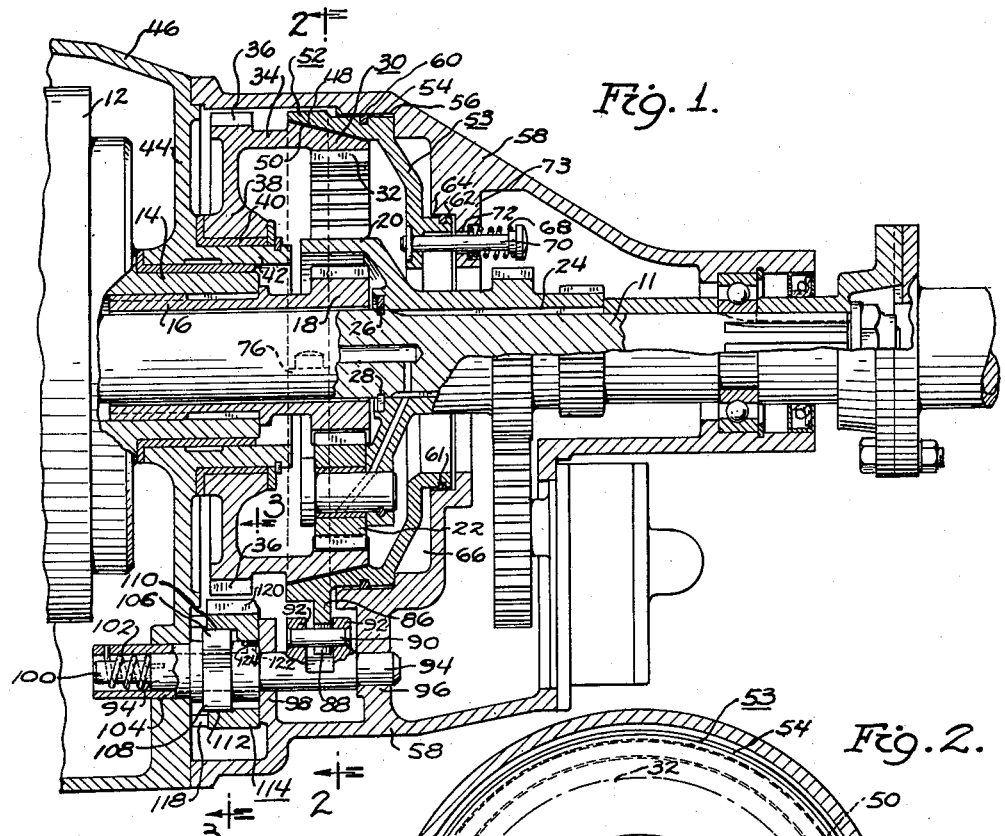
Fig. 1.
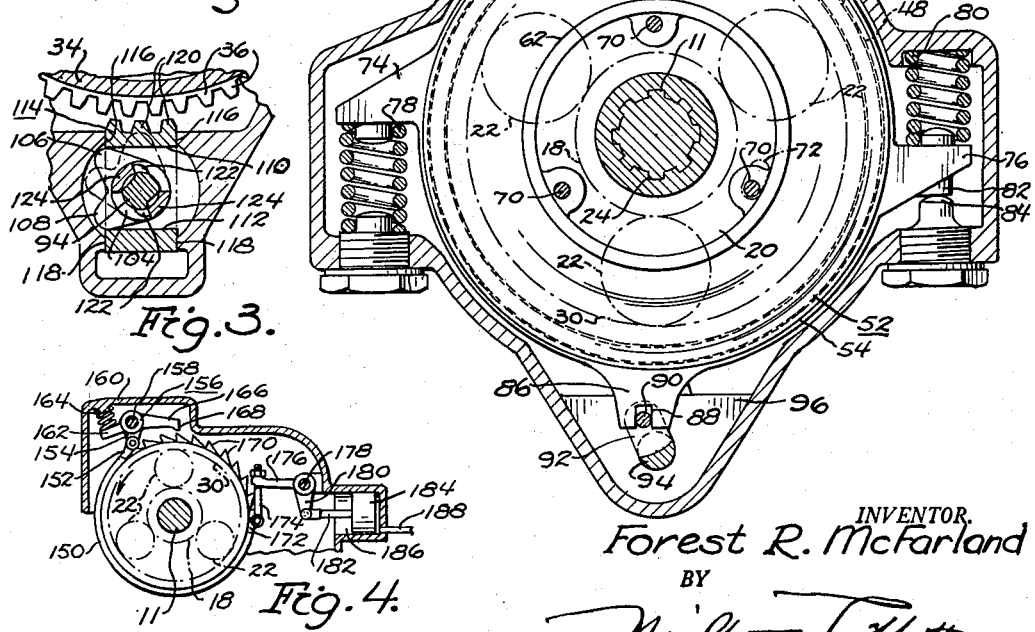
Fig. 2.
Fig. 3.
Fig. 4.
INVENTOR.
Forest R. McFarland
BY
Milton J. Tibbetts
ATTORNEY.

Patented Apr. 21, 1953

2,635,713

UNITED STATES PATENT OFFICE 2,635,713

BRAKE

Forest R. McFarland, Huntington Woods, Mich., assignor to Packard Motor Car Company, Detroit, Mich., a corporation of Michigan Application October 8, 1947, Serial No. 778,689

7 Claims. (Cl. 188—68)

This invention relates to brakes, and more particularly to an improved brake for torque multiplying mechanism.

An object of this invention is to provide a brake for a mechanism that can readily be engaged without the necessity of synchronizing gears.

A further object of the invention is to provide successively engaging friction and locking means to hold a rotatable member of a planetary gear train against rotation to effect a torque increasing drive.

Another object of the invention resides in the provision of a friction member to brake a rotatable member of a planetary gear train to effect a torque multiplying drive, and a positive lock operated by predetermined movement of the friction member in response to torque reaction to lock the rotatable member for maintaining the torque multiplying drive.

Yet a further object of the invention is to provide a lock for a rotatable member of a planetary gear mechanism where the torque exerted on the rotatable member is higher than it is practical to hold with a friction brake.

Still another object of the invention is to provide frictional means to brake a rotatable member of a planetary gear train to effect a torque multiplying drive, and a mechanical lock actuated by predetermined rotational movement of the frictional means to positively lock the rotatable member.

Other objects of this invention will appear in the following description and appended claims, reference being had to the accompanying drawings forming a part of this specification wherein like reference characters designate corresponding parts in the several views.

Fig. 1 is a fragmentary sectional view of a transmission embodying this invention.

Fig. 2 is a sectional view taken substantially on the line 2—2 of Fig. 1, looking in the direction of the arrows, the brake element being shown in elevation.

Fig. 3 is a fragmentary sectional view taken substantially on the line 3—3 of Fig. 1 looking in the direction of the arrows.

Fig. 4 is a sectional view illustrating a modified form of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This invention is illustrated as applied to a transmission of the general type disclosed in my earlier Patent Number 2,324,713 issued July 20, 1943. In the construction illustrated in said patent a tail shaft or driven shaft 11 is secured to the planet carrier of suitable planetary gearing housed within a casing 12. A reverse driving shaft 14 may be driven by any suitable means, such for example as by the ring gear carrier of the planetary gearing housed within the casing 12.

The construction of the planetary gearing housed within the casing 12 is of course such that the planet carrier secured to the tail shaft or driven shaft 11 exerts a forwardly directed torque to drive the driven shaft 11 in the forward direction, and the ring gear secured to the shaft 14 exerts a rearwardly directed torque to drive the shaft 14 in the reverse direction. The tail shaft or driven shaft 11 can of course be driven in the reverse direction if the reverse torque exerted on the shaft 14 by the ring gear of the planetary gearing housed within the casing 12 is connected to the driven shaft 11 and is multiplied to overcome the forwardly directed torque exerted on the driven shaft 11 by the carrier of the planetary gearing housed within the casing 12.

My improved torque multiplying mechanism for increasing the reverse torque is illustrated as embodied in a planetary gear train interposed between the reverse driving shaft 14 and the driven shaft 11. The reverse driving shaft 14 is splined to another driving shaft 16 preferably concentrically mounted on the driven shaft 11, and having a sun gear 18 secured thereto. A planet carrier 20 having pinions 22 meshing with the sun gear 18 is splined at 24 to the driven shaft 11, a ring 26 positioned in a groove 28 in the driven shaft 11 forming an abutment to locate the carrier with reference to the driven shaft 11.

A ring gear 30 having internal gear teeth 32 is provided to engage the planet pinions 22. The ring gear 30 has an axially extending cylinder 34 having external gear teeth 36, and is provided with a hub 38 rotatably mounted on a bearing 40 carried by an axially extending cylinder 42 fixed to an inwardly extending flange 44 carried by a casing 46.

The ring gear 30 is provided with a conical surface 48 adapted to be engaged by a reversely disposed conical friction surface 50 of an axially movable braking member 52 actuated by a compound piston 53 to engage the conical surfaces 50 and 48 to brake the ring gear 30 to multiply torque exerted on the reversely driven shaft 14 through the pinions 22 to overcome the forwardly directed torque exerted on the driven shaft 11 and drive it in the reverse direction. The compound piston 53 has a large diameter piston 54 slidably mounted in a cylinder 56 formed in a casing 58 secured to the casing 46. A sealing ring 60 positioned in a groove formed in the piston 54 is provided to seal the space between the forward end of the compound piston 53 and the casing 58. The compound piston 53 has a smaller diameter piston 62 slidably mounted in a cylinder 64 formed in the casing 58, a sealing ring 61 being interposed between the piston and the cylinder to seal the space between the rear end of the compound piston and the casing 58.

Fluid under pressure from any suitable source, such for example as a pump driven by the shaft 14, may be introduced into a chamber 66 interposed between the casing 58 and the sections of large and smaller diameter 54 and 62 of the compound piston 53 to urge the braking member 52 forwardly into braking engagement with the ring gear 30. A plurality of return springs 68 mounted on pins 70 carried by the compound piston 53, and extending through arcuate shaped slots 72 formed in a web 73 of the casing 58 are provided to yieldingly urge the brake member 52 toward the ring gear releasing position.

In certain types of torque increasing mechanisms the force required to hold a movable member such for example as a ring gear of a planetary gear train against rotation is greater than it is practical to attempt to hold with a friction brake. Means have therefore been provided to interpose a positive lock to clamp the movable member against rotation to insure continued operation of the torque multiplying drive. It is of course desirable that the movable member be stationary at the time the positive lock is engaged to prevent damaging the locking mechanism. Means operated by predetermined rotational movement of a friction braking mechanism due to torque reaction have therefore been provided to automatically engage the positive locking mechanism after the friction brake has been engaged to exert a predetermined braking effort on the rotatable member.

One illustrative example of ring gear locking mechanism actuated by a friction braking mechanism is illustrated in Figs. 1 to 3. As more clearly shown in Fig. 2 the braking member 52 has a pair of oppositely extending reversely disposed abutments 74 and 76, positioned forwardly of the large diameter piston 54 adapted to engage springs 78 and 80 respectively interposed between the abutments and spaced portions of the casing 58 to yieldingly urge the braking member toward a normal position when a boss 82 carried by the abutment 76 engages a stop 84 secured in the casing 58. When the brake member 52 is actuated to brake the ring gear 30, the torque reaction exerted on the conical friction surface 50 of the brake member 52 oscillates it in the counter-clockwise direction as viewed in Fig. 2.

The brake member 52 is provided with a radially extended projection 86 having a slot 88 to receive an actuating member 90 carried by spaced arms 92 fixed to a shaft 94 journalled in webs 96 and 98 in the casing 58. As more clearly illustrated in Figs. 1 and 3 the shaft 94 is provided with a stem 100 having one end of a coiled spring 102 secured thereto. The other end of the spring is secured to a sleeve 104 mounted on the shaft 94 and having spaced cam members 106 and 108 engaging upper and lower surfaces 110 and 112 of a ring gear locking mechanism in the form of a locking plunger 114, slidably mounted between upper and lower guides 116 and 118, and having gear teeth 120 adapted to mesh with the teeth 36 of the cylinder 34 carried by the ring gear 30 to provide a positive lock to prevent the ring gear from rotating to insure continuance of the torque multiplying drive.

It will be noted that the locking plunger 114 is yieldingly actuated by the spring 102. If the teeth 120 of the plunger 114 and the teeth 36 carried by the ring gear 30 are not aligned for meshing engagement when the plunger 114 is actuated, the ends of the teeth will engage each other, and the teeth 120 will be urged into meshing engagement with the teeth 36 by the spring 102 when the ring gear 30 rotates sufficiently to permit the teeth 120 and 36 to mesh. There is thus no danger of injuring the locking mechanism due to misalignment of the gear teeth.

The shaft 94 which actuates the locking plunger 114 of the ring gear locking mechanism is provided with radially extended projections 122 adapted to extend between axially extending projections 124 carried at the inner end of the sleeve 104 to rotate the sleeve 104 in the counter-clockwise direction as viewed in Fig. 3 when the brake member 52 is released, and the springs 78 and 80 return it to the normal position illustrated in Fig. 2. The cam 108 carried by the sleeve 104 engages the lower surface 112 of the locking plunger 114 and moves the plunger to the retracted position illustrated in full lines in Figs. 1 and 2, thereby disengaging the teeth 120 of the plunger from the teeth 36 of the ring gear to release it and interrupt the torque multiplying drive.

The operation is as follows: To engage the torque multiplying mechanism to drive the driven shaft 11 in the reverse direction a suitable actuating lever is moved to the reverse drive position whereupon fluid under pressure from a suitable source is introduced into the chamber 66 to actuate the compound piston 53 and engage the conical friction surface 50 of the brake member 52 with the conical surface 48 of the ring gear 30. As the ring gear 30 is braked a torque multiplying drive is transmitted to the driven shaft 11 through the pinion gears 22. The areas of the conical friction surfaces 48 and 50 is proportioned with reference to the effective area of the chamber 66 of the compound piston 53 and the pressure of the fluid introduced into the chamber 66 that the ring gear 30 will be restrained from rotating when the reverse drive mechanism is actuated. When increased power from the engine is exerted through the reversely driven shaft 14 the torque reaction exerted on the brake member 52 increases. Increased torque reaction oscillates the brake member 52 in the counter-clockwise direction as viewed in Fig. 2 against the resistance of springs 78 and 80, the pins 70 carrying the brake return springs 68 moving in the arcuate slots in the web member 73.

Movement of the brake member 52 in the counter-clockwise direction rotates the shaft 94 through the actuating member 90 and the arms 92. Rotation of the shaft 94 tensions the spring 102 thereby exerting a yielding force through the sleeve 104 and cam 106 urging the locking plunger 114 to engage its locking teeth 120 with the teeth 36 carried by the ring gear 30. A positive lock is thus provided to prevent the ring gear from rotating and insure continuance of the torque multiplying drive.

When the reverse drive is released due to movement of the actuating member out of the reverse drive position, the supply of fluid under pressure to the chamber 66 is interrupted, and the return springs 68 return the compound piston 53 to the brake released position. The springs 78 and 80 then return the brake member 52 to the normal position and rotate the shaft 94 in the clockwise direction to the positive lock disengaging position as illustrated in Fig. 2. The radial projections 122 carried by the shaft 94 engage the axial projections 124 carried by the sleeve 104 and rotate the sleeve in the counter-clockwise direction as viewed in Fig. 3 whereupon the cam 108 of the sleeve engages the lower surface 112 of the locking plunger 114 and positively moves it to disengage its locking teeth 120 from the teeth 36 carried by the ring gear 30. The ring gear is then released whereupon the driven shaft 11 may be driven in the forward direction.

It will be noted that the locking plunger 114 is moved to the retracted position by the initial releasing movement of the ring gear braking mechanism because as the torque reaction exerted on the brake member 52 diminishes, the springs 78 and 80 return the member 52 and the shaft 94 to the normal position illustrated in Fig. 2 thereby withdrawing the locking plunger 114 before the brake member 52 releases the ring gear. It will of course be apparent that the angular relation of the gear teeth 120 and 36 of the locking plunger 114 and the ring gear 30 respectively is such as to assist in repelling the plunger 114 when the force urging it toward the blocking position is released.

The embodiment of the invention illustrated in Fig. 4 is similar in many respects to that illustrated in Figs. 1 to 3. It will be noted that a brake band 150 is provided to engage the ring gear 30. One end 152 of the brake band is pivotally connected to an arm 154 of a three armed bell crank 156 pivoted at 158 to the case 160 to provide a reaction point. Another arm 162 of the bell crank engages a spring 164 interposed between it and the case 160. The third arm 166 of the bell crank 156 is provided with an actuating end 168 to engage notch shaped teeth 170 carried by the ring gear 30 to provide a positive lock to prevent rotation of the ring gear to insure continuation of the reverse drive.

The other end 172 of the brake band 150 is provided with an actuating link 174 adapted to be engaged by an arm 176 of a bell crank pivoted on the case 160 at 178. The other arm 180 of the bell crank is connected through a link 182 to a piston 184 slidably mounted in a cylinder 186, having a fluid inlet conduit 188 communicating therewith.

The operation of this embodiment of the invention is as follows: To engage the torque multiplying mechanism to drive the driven shaft 11 in the reverse direction, the reverse control mechanism is actuated, whereupon fluid under pressure is introduced through the conduit 188 into the cylinder 186 to move the piston 184 toward the left as viewed in Fig. 4 to engage the brake band 150 with the ring gear 30. With the ring gear braked the drive is transmitted from the sun gear 18 secured to the reversely driven shaft 14, through the pinions 22 rolling inside of the ring gear 30 to multiply torque to overcome the forwardly directed torque exerted on the driven shaft 11 and drive it in the reverse direction.

If the torque reaction exerted on the brake band 150 is sufficient to carry the brake band around with the ring gear 30 in the counter-clockwise direction the end 152 of the brake band exerts a force on the arm 154 of the bell crank 156 to oscillate it about the pivot point 158 thereby engaging the actuating end 168 of the arm 166 with one of the notch shaped teeth 170 carried by the ring gear 30 to provide a positive lock to prevent rotation of the ring gear 30, and compressing spring 164.

When the brake is released the spring 164 urges the bell crank 156 to oscillate in the counter-clockwise direction about its pivot 158 thereby disengaging the actuating end 168 of the arm 166 from the teeth 170 of the ring gear 30 to release the positive lock of the ring gear. The brake band 150 is then released by conventional release mechanism.

It will be understood that various forms of the invention other than that described above may be used without departing from the spirit or scope of the invention.

I claim:

1. A brake mechanism for a rotatable machine element, said brake comprising a band type friction means including a movable actuating end and a movable anchor end, a movable support means cooperating with said anchor end, said anchor support means and said anchor end being movable in accordance with the torque in the rotatable machine element, means operably connected to the actuating end of the friction means to engage the friction means with the rotatable machine element, external tooth means carried by the machine element, a stationary member, a three-armed bell crank pivoted on the stationary member, connecting means between one of the arms of said bell crank and the anchor end of the friction means, a pawl carried by another arm of the bell crank to engage the external tooth means carried by the machine element upon predetermined movement of the anchor end of the friction means, and yielding means engaging the third arm of the bell crank urging the bell crank toward the brake released position.

2. A brake mechanism for a rotatable machine element, said brake comprising a band type friction means having a movable anchor end and a movable actuating end, movable supports for said ends, said anchor end support being biased in one direction but being movable against said biasing force in accordance with the torque in the rotatable machine element, positive means including an angularly movable pawl associated with the anchor end of the friction means and external tooth means carried by the machine element for locking said element against rotation, means operable by predetermined movement of the anchor end of the friction means to engage the pawl with the external tooth means to actuate the positive means, and yielding means urging the pawl toward a releasing position.

3. A brake mechanism for a rotatable machine element, said brake comprising a band type friction member adapted to engage the machine element and having movable actuating and anchor ends, movable support means for said ends, said anchor end support including means movable in accordance with the torque developed in the initial stage of operation of said brake means, means connected to the movable actuating end to operate the brake means, external locking teeth carried by the machine element, a locking pawl operably connected to the anchor end of the friction member to engage the external locking teeth to lock the rotatable element against rotation upon predetermined movement of the anchor end, and said means included in said support for the anchor end having yielding means urging the pawl to release the machine element.

4. A brake mechanism for a rotatable machine element mounted on a transmission case, said brake mechanism comprising a band, bearing supports at each end of said band, both of said bearing supports including movable elements cooperating with the ends of said bands, means for engaging the band with the rotatable machine element, said elements carrying the ends of the band through a limited rotational movement, a pawl pivotally mounted on the case, locking tooth means on the machine element, a connection between the pawl and band such that the pawl is operated by predetermined movement of the band to engage the locking teeth to lock the machine element to the case, and yielding means energized by predetermined movement of the band to exert a yielding force to release the locking means upon predetermined release of the brake mechanism.

5. In a reverse drive mechanism, planetary speed reduction gearing including a freely mounted reaction gear having internal and external teeth, C-shaped friction brake band means operable to engage said gear and movable mounting means at each end of said band adapted to permit the band to have limited rotational movement in response to predetermined torque, a pivotally mounted pawl for engaging the external teeth of the gear, and actuator means for the pawl including a spring, means interconnecting said actuator with said band to be driven by the movement of the band, said spring being energized upon engagement of the pawl to urge said pawl toward a disengaged position, and said actuator means being responsive to rotational movement of the friction brake means whereby said pawl is driven between its engaged and disengaged position according to movement of the band.

6. In a reverse drive mechanism, planetary speed reduction gearing including a freely mounted reaction gear having internal and external teeth, C-shaped friction brake band means operable to engage said gear and movable mounting means at each end of said band adapted to permit the band to have limited rotational movement in response to predetermined torque, a pivotally mounted lever having at least two arms, one arm being provided with a pawl for engaging the external teeth of the gear, and actuator means for the lever including a spring, means interconnecting said actuator with said band to be driven by the movement of the band, said spring being energized upon engagement of the pawl to urge said pawl toward a disengaged position, and said actuator means being responsive to rotational movement of the friction brake means whereby said pawl is driven between its engaged and disengaged position according to movement of the band.

7. In a reverse drive mechanism, planetary speed reduction gearing including a freely mounted reaction gear having internal and external teeth, C-shaped friction brake band means operable to engage said gear and movable mounting means at each end of said band adapted to permit the band to have limited rotational movement in response to predetermined torque, a pivotally mounted three armed bell crank lever, one of said arms forming a pawl for engaging the external teeth of the gear, and actuator means connected between one end of said brake band and another of said arms, a spring cooperating with the remaining arm, said spring being energized upon engagement of the pawl to urge said pawl toward a disengaged position, and said actuator means being responsive to rotational movement of the friction brake means to drive said bell crank to engage said pawl when said brake band is engaged on said gear and said predetermined torque is encountered.

FOREST R. McFARLAND.

References Cited in the file of this patent

UNITED STATES PATENTS

| Number | Name | Date |
|---|---|---|
| 1,448,095 | Steel et al. | Mar. 13, 1923 |
| 2,144,423 | Caldwell | Jan. 17, 1939 |
| 2,145,255 | Granberg et al. | Jan. 31, 1939 |
| 2,284,047 | Edwards | May 26, 1942 |